(12) United States Patent
Kim et al.

(10) Patent No.: US 9,008,069 B2
(45) Date of Patent: Apr. 14, 2015

(54) METHOD OF UTILIZING RESOURCES EFFICIENTLY IN A REVERSE LINK TRANSMISSION

(75) Inventors: Sang G. Kim, San Diego, CA (US);
Young C. Yoon, San Diego, CA (US);
Li-Hsiang Sun, San Diego, CA (US);
Suk Woo Lee, San Diego, CA (US);
Hobin Kim, San Diego, CA (US); Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 916 days.

(21) Appl. No.: 11/774,544

(22) Filed: Jul. 6, 2007

(65) Prior Publication Data

US 2008/0084841 A1 Apr. 10, 2008

Related U.S. Application Data

(60) Provisional application No. 60/806,761, filed on Jul. 7, 2006, provisional application No. 60/863,935, filed on Nov. 1, 2006.

(51) Int. Cl.
*H04W 28/00* (2009.01)
*H04W 72/12* (2009.01)
*H04L 1/00* (2006.01)
*H04L 5/00* (2006.01)

(52) U.S. Cl.
CPC ......... *H04W 72/1268* (2013.01); *H04L 1/0026* (2013.01); *H04L 1/0078* (2013.01); *H04L 5/0007* (2013.01)

(58) Field of Classification Search
CPC .. H04B 7/2656; H04L 5/0023; H04L 5/0053; H04L 27/2601; H04L 5/0044; H04L 5/0048; H04L 5/0057; H04L 5/0007; H04L 5/0092; H04L 1/0001; H04W 72/042; H04W 24/10; H04W 48/12; H04W 72/0413; H04W 72/04; H04W 28/04; H04W 72/0406
USPC ......... 370/344, 321, 337, 338, 345, 346, 347, 370/349, 470, 471, 472
See application file for complete search history.

(56) References Cited

U.S. PATENT DOCUMENTS

| | | | |
|---|---|---|---|
| 2004/0120301 A1 | 6/2004 | Kitchin | |
| 2004/0152478 A1 | 8/2004 | Ruohonen et al. | |
| 2005/0013283 A1 * | 1/2005 | Yoon et al. | 370/350 |
| 2005/0259627 A1 | 11/2005 | Song et al. | |
| 2006/0223449 A1 * | 10/2006 | Sampath et al. | 455/69 |
| 2007/0097909 A1 * | 5/2007 | Khandekar et al. | 370/329 |
| 2007/0097942 A1 * | 5/2007 | Gorokhov et al. | 370/342 |

(Continued)

FOREIGN PATENT DOCUMENTS

| | | |
|---|---|---|
| CN | 1729651 | 2/2006 |
| CN | 1729651 A * | 2/2006 |

(Continued)

OTHER PUBLICATIONS

European Patent Office Application Serial No. 07768642.6, Search Report dated Dec. 12, 2013, 9 pages.

*Primary Examiner* — George Eng
*Assistant Examiner* — Jing Gao
(74) *Attorney, Agent, or Firm* — Lee, Hong, Degerman, Kang & Waimey

(57) ABSTRACT

A method of transmitting data by at least one access terminal (AT) in a wireless communication system is disclosed. More specifically, the method includes ceasing all transmissions by the at least one AT during a duration corresponding to a duration used by an access node (AN) to transmit a superframe preamble, wherein the superframe comprises a plurality of physical frames.

6 Claims, 4 Drawing Sheets

(56) References Cited

U.S. PATENT DOCUMENTS

2007/0268848 A1* 11/2007 Khandekar et al. .......... 370/295
2008/0285526 A1* 11/2008 Gorokhov et al. .......... 370/338

FOREIGN PATENT DOCUMENTS

| | | |
|---|---|---|
| EP | 1657843 | 5/2006 |
| JP | 2003032736 | 1/2003 |
| JP | 2003032736 A * | 1/2003 |
| JP | 2007531347 | 11/2007 |
| JP | 2008519566 | 6/2008 |
| JP | 2008536387 | 9/2008 |
| WO | 2004/114550 | 12/2004 |
| WO | 2005011163 | 2/2005 |
| WO | 2006052502 | 5/2006 |
| WO | 2006107835 | 10/2006 |

* cited by examiner

METHOD OF UTILIZING RESOURCES EFFICIENTLY IN A REVERSE LINK TRANSMISSION

This application claims the benefit of U.S. Provisional Application No. 60/806,761, filed on Jul. 7, 2006, and U.S. Provisional Application No. 60/863,935, filed on Nov. 1, 2006, which are hereby incorporated by reference.

BACKGROUND OF THE INVENTION

1. Field of the Invention

The present invention relates to a method of utilizing resources, and more particularly, to a method of utilizing resources efficiently in reverse link transmission.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3 G communication systems are conceptually similar to each other with some significant differences.

In today's wireless communication system, a user (or a mobile) can freely roam about while enjoying uninterrupted service. As such, it is important to improve upon current wireless communication technology to enhance the user's way of life in terms of wireless communication technology. To this end, better schemes and techniques can be devised so as to improve efficiency as well as effectiveness of service of a communication system under the all sorts of different conditions and environments of the wireless system. To address various conditions and environments and to enhance communication service, various methods, including more efficient utilization of wireless resources, in both forward link and reverse link, can be implemented to promote more effective and efficient transmission.

SUMMARY OF THE INVENTION

Accordingly, the present invention is directed to a method of utilizing resources efficiently in reverse link transmission that substantially obviates one or more problems due to limitations and disadvantages of the related art.

An object of the present invention is to provide a method of transmitting data by at least one access terminal (AT) in a wireless communication system.

Another object of the present invention is to provide a method of measuring data for load control by an access node (AN) in a wireless communication system A further object of the present invention is to provide a structure of a superframe.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data by at least one access terminal (AT) in a wireless communication system includes ceasing all transmissions by the at least one AT during a duration corresponding to a duration used by an access node (AN) to transmit a superframe preamble, wherein the superframe comprises a plurality of physical frames.

In another aspect of the present invention, a method of measuring data for load control by an access node (AN) in a wireless communication system includes measuring noise variance during a duration in which all transmissions from at least one access terminal (AT) is ceased and the duration corresponds to a duration used by the AN to transmit a superframe preamble, wherein the superframe comprises a plurality of physical frames.

In a further aspect of the present invention, a structure of a superframe includes a plurality of reverse link (RL) physical frames which correspond to a plurality of forward link (FL) physical frames and a preamble, wherein a first part of a RL physical frame corresponding to the FL preamble is devoid of data and a second part of RL physical frames corresponding to other FL physical frames are occupied with data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
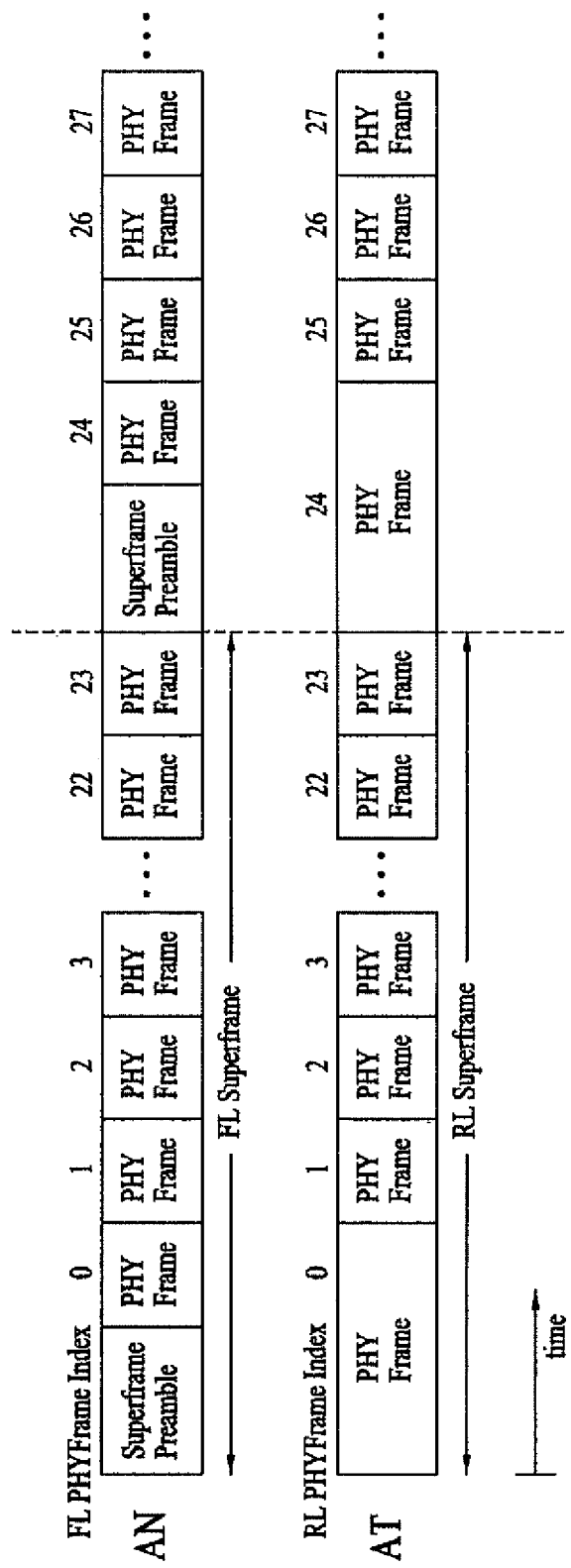
FIG. 1 is an exemplary diagram illustrating a structure of a superframe in which a first physical frame is repeated or elongated.

Reference will now be made in detail to the preferred embodiments of the present invention, examples of which are illustrated in the accompanying drawings. Wherever possible, the same reference numbers will be used throughout the drawings to refer to the same or like parts.

Typically, an access terminal (AT) receives permission from an access network (AN) before transmitting data. This operation can be referred to as scheduling. In order to schedule for transmission or receive permission from the AN, the AT can request for permission with such information as amount of data it has in the buffer, power headroom, etc. This request can be transmitted to the AN at any time. That is the AT can transmit the request whenever necessary and/or at a predetermined time. After the scheduling is completed, the AT can then transmit data to the AN.

With respect to data transmission in a wireless communication system, an unit of transmission can be defined by a specified number of physical frames and a preamble. This can be referred to as a superframe. The transmission unit is applicable to both a forward link (FL) and reverse link (RL) transmission. Superframe preamble is mainly for FL transmission but does not preclude RL transmission.

The transmission unit or the superframe comprises 24 or 25 physical frames and a preamble. Each physical frame includes a plurality of orthogonal frequency division multiplexing (OFDM) symbols. For example, the physical frame comprises eight (8) symbols (e.g., 8×113.93 μs (6.51 μs CP)=911.44 μs). Each OFDM symbol duration is 113.93 μs including 6.51 μs cyclic prefix. Moreover, the preamble includes 8 OFDM symbols.

The superframe typically starts with the preamble in the FL, mainly to provide synchronization. The superframe is also used to carry network-specific and sector-specific information. Because the AT needs to know the start of the reference timing so that the RL transmission can be synchronized with the FL transmission. In other words, the RL transmission can be aligned with the FL transmission (e.g., same superframe duration) for efficient transmission.

Generally, the superframe preamble can carry packet control information, packet data, and a paging channel, and these can be transmitted periodically in the superframe preamble. More specifically, the preamble carries broadcast channels. The first five (5) OFDM symbols carry fast packet broadcast control channel (F-PBCCH) and fast secondary broadcast control channel (F-SBCCH) in even superframes, and the F-PBCCH and fast quick paging channel (F-QPCH) in odd superframes.

Further, the preamble can be identified based on time and frequency and further identified by sector specific sequences. That is, the preamble can include time division multiplexing (TDM) pilots, code division multiplexing (CDM) pilots, and/or sector-specific sequence.

For example, the preamble can include TDM pilots (e.g., TDM 1, TDM 2, and TDM 3). TDM 1 carries sector specific information and/or generalized chirp-like (CCL) sequence for time/frequency synchronization. TDM 2 and TDM 3 are sector-specific sequences (e.g., Walsh sequences). In addition, other sector interference channel (OSICH) can be transmitted as a differential phase between TDM 2 and TDM 3 (e.g., 0, 2π/3, −2π/3).

In general, the physical frames of the superframe contain data, control information, and dedicated pilot, among others. The physical frames are often preceded by a preamble. The preamble is designed to support synchronization (time and frequency) and to transmit system parameters, overhead messages, and so on, in the FL. Lastly, the durations of the superframe for the FL and the RL are the same.

A FL transmission is a transmission made from the AN to an access terminal (AT). On the contrary, a RL transmission is a transmission made from AT to an AN. Typically, the RL transmission includes transmission made from multiple sources (e.g., ATs) to a single destination (e.g., AN).

Due to the nature of RL transmissions, which includes transmission from multiples sources to a single destination, the transmission of physical frames is not preceded by a preamble. Furthermore, due the superframes in the FL and RL having the same durations, the transmission may be less efficient.

To address this lack of preamble and the durational issue, the superframe can be modified. More specifically, the first physical frame can be repeated or put differently, the first physical frame can be elongated, so as to maintain the same durations of superframe in the FL and RL. FIG. 1 is an exemplary diagram illustrating a structure of a superframe in which a first physical frame in RL is repeated or elongated.

Referring to FIG. 1, the first physical frame of the AT, which relates to the transmission in the RL, is repeated (or elongated). Comparing to the first physical frame of AN, the first physical frame of the AT is longer (e.g., twice) than that of the AN. That is, the first RL physical frame is elongated to align with the preamble and the first physical frame of the FL so that the FL and the RL transmissions can be synchronized.

Figure 2:
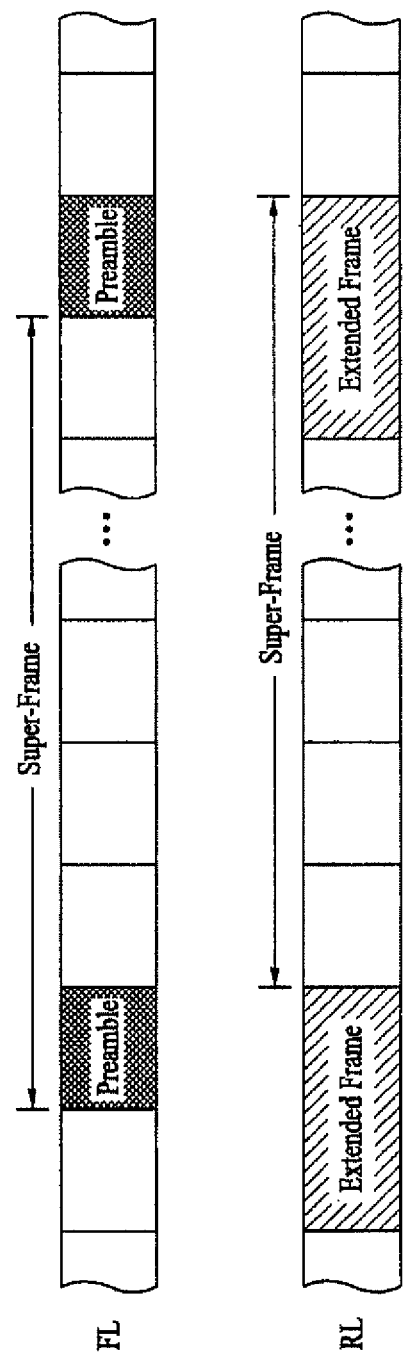
FIG. 2 is another exemplary diagram illustrating a structure of a superframe in which first physical frame is repeated or elongated.

FIG. 2 is another exemplary diagram illustrating a structure of a superframe in which first physical frame is repeated or elongated. The description of FIG. 2 is similar to that of FIG. 1.

Referring to the descriptions with respect to FIGS. 1 and 2 regarding repeated or elongated first physical frame, the resources (e.g., frequency bandwidth and time) can be considered to be utilized inefficiently. As such, the physical frames can be considered to be protected differently.

Therefore, instead of repeating or elongating the first physical frame in the RL, the duration of the first RL frame can be modified to correspond to the duration of the FL preamble. Hereinafter, this RL frame can be referred to as the RL portion.

In the transmission to the AN, the RL portion (or the redundant part) can include the requests for RL transmissions from the ATs, feedback information including absolute values of channel quality feedbacks from the ATs, and/or periodic silent moment or silent period (e.g., null) to help the AN measure noise variance. As described above, the requests can refer to scheduling and receiving permission from the AN. Furthermore, the channel quality feedback can relate to multi-input, multi-output (MIMO) channels, beamforming, and/or sub-band(s).

The measured noise variance can be used to control the reverse link load through interference-over-thermal (IoT) or rise-over-thermal (RoT). Moreover, the requests and the feedback information (e.g., absolute channel quality feedback transmissions) share the resources with data transmission in physical frames. Using this approach of request reallocation and absolute channel quality feedback transmissions, the available resources for data transmission can be increased.

Figure 3:
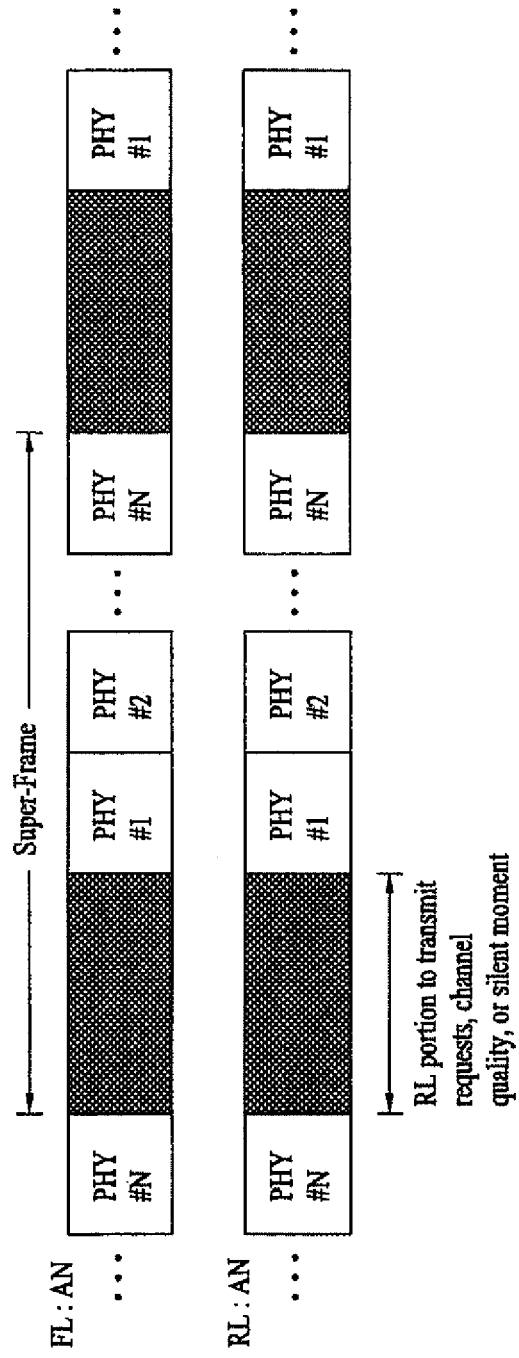
FIG. 3 is an exemplary diagram illustrating utilization of RL resources in the superframe.

FIG. 3 is an exemplary diagram illustrating utilization of RL resources in the superframe. In FIG. 3, the RL portion of the superframe, which corresponds to the preamble portion of the FL superframe, can include request(s), feedback information (e.g., channel quality information (CQI)), and silent moment/period. As illustrated, the duration of the RL portion corresponds to the duration of the preamble portion of the FL. Furthermore, the duration of the preamble portion of the FL can be the same as the duration of one FL physical frame.

In comparison to FIGS. 1 and 2 in which the first frame (e.g., RL portion) is elongated and does not correspond to the superframe preamble of the FL, the RL portion, as illustrated in FIG. 3, is configured to correspond to the duration of the preamble. As a result, the resources can be used more efficiently.

Alternatively, the RL portion corresponding to the duration of the FL superframe preamble can be divided into the duration of the physical frame and the remaining duration. In other words, the preamble duration is equal to the duration of the physical frame plus the remaining duration. The duration of the RL portion can vary based on the duration of the physical frame.

As discussed, the remaining duration can be used to transmit the requests from the AT(s), feedback information including absolute values of channel quality feedbacks from the ATs, and/or periodic silent moment/period to help the AN measure noise variance.

Alternatively, the preamble duration can be equal to the duration of the physical frame. Here, the remaining duration is not necessary since the preamble duration and the duration of the physical frame are equal.

Figure 4:
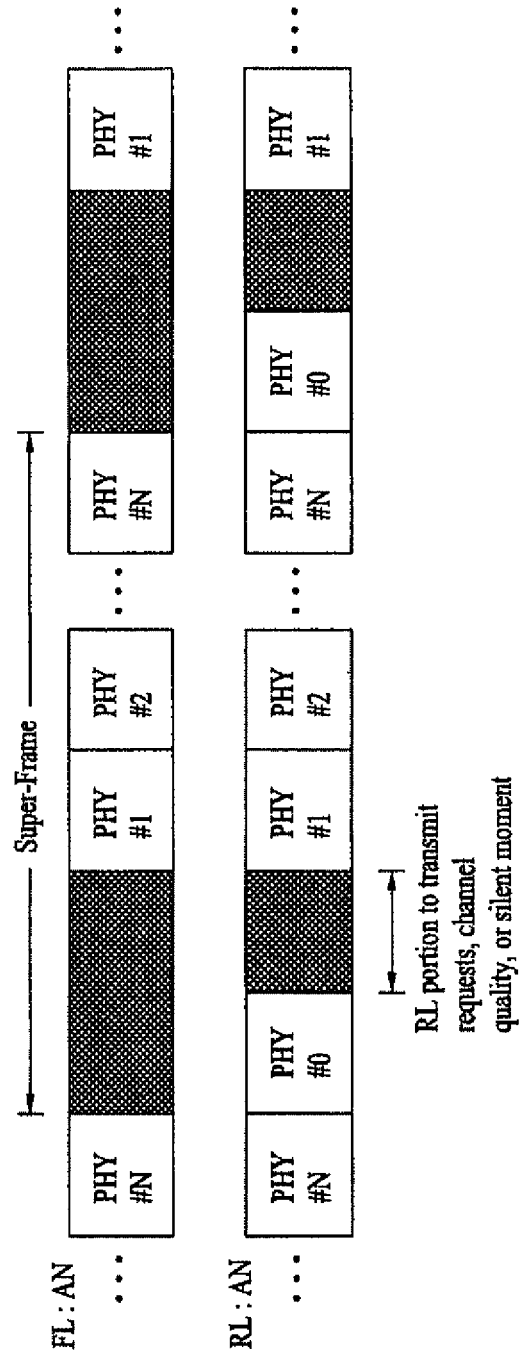
FIG. 4 is another exemplary diagram illustrating utilization of RL resources in the superframe.

FIG. 4 is another exemplary diagram illustrating utilization of RL resources in the superframe. In FIG. 4, the RL portion can be used to transmit the requests from the AT(s), feedback information, and/or silent moment/period. Depending on the amount of data to transmit in the RL, the duration of the AT can vary. That is, the duration of the RL (or the RL portion) may be shorter than the duration of the superframe preamble of the FL. As illustrated, the duration of the RL portion can be half of that of the superframe preamble. Moreover, this RL portion can be placed in the front half or back half relative to the corresponding superframe preamble of the FL. Referring to FIG. 4, the RL portion is placed in the back half with respect to the preamble, but it can be placed in the front half as well.

Alternatively, the duration of the RL portion can be equal to the duration of the superframe preamble. That is, the duration can be eight (8) symbols when RL is shorter than the duration of the superframe preamble as illustrated in FIG. 4 or the duration of the RL portion can be 16 symbols which correspond to the duration of the superframe preamble. In fact, the duration of the RL portion can be eight (8) as well as multiples of eight (8) (e.g., 16, 24, and so on).

The silent moment/period can be total or partial with respect to the resources silenced. In the case of total silence period, nothing is transmitted over the entire bandwidth during the predefined duration (e.g., remaining duration). The silent moment/period can be a period during which null signals are transmitted to the AN from all ATs. Here, null signals transmission means that no signals are transmitted to the AN from all ATs.

Furthermore, some frequency bandwidths (sub-bands or collection of sub-carriers) can be silenced, in the case of partial silence moment/period during the predefined duration.

For example, referring to FIG. 4, a physical frame (e.g., PHY#0) and the RL portion combined correspond to the preamble duration. After the PHY#0 is transmitted, the silence period follows during which nothing (or null signals) is transmitted. Furthermore, instead of sending nothing (or null signals), requests and/or channel quality feedback can be transmitted.

From the AT's perspective, transmission to the AN can be controlled. That is, the RL transmission can be ceased periodically. The AT can decide to periodically cease its transmission based on factors such as channel condition. Furthermore, the AT can periodically cease its transmission based on a command from the AN. The AT can be informed of periodic ceasing by a system parameter.

Further, normal transmission of data and/or control channels (or segments) can occur in the duration of physical frame not used in the transmission of the silent moment/period. For example, reverse link acknowledgement channel (R-ACKCH) and/or reverse link data channel (R-DCH) and/or reverse link code division multiple access (CDMA) control segment can be transmitted in the portion of the "long" frame which is not silenced. Here, the data channel includes any format of transmission including OFDM, CDMA, etc.

It will be apparent to those skilled in the art that various modifications and variations will be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data by a terminal in a wireless communication system, the method comprising:
    transmitting, by the terminal, first type link control information during a first part of a first frame on a first type link of a superframe,
    wherein a second part of the first frame on the first type link is a silent period during which all transmission by the terminal is ceased,
    wherein the first part of the first frame on the first type link corresponds to a predefined number of orthogonal frequency division multiplexing (OFDM) symbols portion of a first frame on a second type link, and the second part of the first frame on the first type link corresponds to a remaining portion of the first frame on the second type link;
    receiving, by the terminal, a second type link signal from a base station in the first frame on the second type link; and
    transmitting, by the terminal, data in a second frame on the first type link of the superframe,
    wherein the second type link signal carries second type link data and second type link control information for the terminal,
    wherein no data is transmitted by the terminal during the first part where the control information is transmitted in the first frame on the first type link, and no data is transmitted during the second part which is the silent period in the first frame on the first type link,
    wherein the first type link is directed from the terminal and the second type link is directed from the base station.

2. The method of claim 1,
    wherein the superframe comprises a plurality of physical frames, and
    wherein each of the plurality of physical frames comprises a plurality of OFDM symbols.

3. The method of claim 1, wherein the ceasing of the transmission occurs periodically.

4. The method of claim 3, wherein the periodic ceasing of the transmission is informed by a system parameter.

5. The method of claim 1, wherein the ceasing of the transmission occurs periodically according to a command from the base station.

6. A device configured to transmit data in a wireless communication system, the device comprising:
    a transceiver configured to
    transmit first type link control information during a first part of a first frame on a first type link of a superframe,
    wherein a second part of the first frame on the first type link is a silent period during which all transmission by the transceiver is ceased,
    wherein the first part of the first frame on the first type link corresponds to a predefined number of orthogonal frequency division multiplexing (OFDM) symbols portion of a first frame on a second type link, and the second part of the first frame on the first type link corresponds to a remaining portion of the first frame on the second type link;
    receive a second type link signal from a base station in the first frame on the second type link; and
    transmit data in a second frame on the first type link of the superframe, wherein the second type link signal carries second type link data and second type link control information for the device, wherein no data is transmitted by the transceiver during the time portion first part where the control information is transmitted in the first frame on the first type link, and no data is transmitted during the second part which is the silent period in the first frame on the first type link, wherein the first type link is directed from the terminal and the second type link is directed from the base station.

* * * * *